(12) United States Patent
Ross et al.

(10) Patent No.: US 6,805,226 B1
(45) Date of Patent: Oct. 19, 2004

(54) CONTINUOUSLY INSTALLABLE/REMOVABLE COLLECTOR TROLLEY

(75) Inventors: Steven L. Ross, Pittsburgh, PA (US); Brian Hilgert, Verona, PA (US)

(73) Assignee: Universal Electric Corporation, Bridgeville, PA (US)

(*) Notice: Subject to any disclaimer, the term of this patent is extended or adjusted under 35 U.S.C. 154(b) by 0 days.

(21) Appl. No.: 10/360,246

(22) Filed: Feb. 7, 2003

(51) Int. Cl.[7] .............................................. B60M 1/00
(52) U.S. Cl. ...................... 191/45 A; 191/52; 191/50
(58) Field of Search ........................... 191/23 R, 23 A, 191/48, 25, 28, 30, 45 R, 49, 50, 52, 63.1, 54.1, 59, 45 A; 104/89, 93, 94, 95, 139, 140; 105/148, 150, 153, 154, 155, 15; 16/91, 97, 106

(56) References Cited

U.S. PATENT DOCUMENTS

| | | | | |
|---|---|---|---|---|
| 2,116,674 A | * | 5/1938 | Harper ........................ | 191/48 |
| 2,210,171 A | * | 8/1940 | Horn ......................... | 191/23 A |
| 2,537,866 A | * | 1/1951 | Tanner ...................... | 191/23 A |
| 2,568,480 A | * | 9/1951 | Barkis ....................... | 191/23 A |
| 3,090,084 A | * | 5/1963 | Banner ....................... | 49/420 |
| 3,345,471 A | * | 10/1967 | Kilburg .................... | 191/45 R |
| 3,722,028 A | * | 3/1973 | Schoenbrod ................... | 16/91 |

OTHER PUBLICATIONS

Industrial Electrial Products, "Feedrail 'Multi–Conductor'", Trolley Busway Electrification Systems, Catalog FRX, (2 pgs.), no date.
Wampfler Total Performance, "Energy Supply Systems", Enclosed Conductor Rail, (1 pg.), no date.
Aero–Motive Company, "Why Use Pow–R–Feed?", (2 pgs.), no date.

* cited by examiner

*Primary Examiner*—Mark Le
(74) *Attorney, Agent, or Firm*—William F. Lang, IV; Eckert Seamans Cherin & Mellott, LLC (57) ABSTRACT

A continuously installable/removable collector trolley includes a plurality of selectively extendable and retractable bearing assemblies. The bearing assemblies may be retracted to permit insertion and removal of the trolley into a conductor bar track at any point along the track. The bearing assemblies may then be extended to secure the trolley within the track, and to permit the bearings to roll along the track, permitting movement of the trolley.

18 Claims, 6 Drawing Sheets

CONTINUOUSLY INSTALLABLE/REMOVABLE COLLECTOR TROLLEY

BACKGROUND OF THE INVENTION

1. Field of the Invention

The present invention relates to enclosed conductor bar systems. More specifically, the present invention provides a conductor bar system providing electrical power to moving equipment, having a trolley that may be installed or removed at any point in the conductor bar system.

2. Description of the Related Art

Presently existing conductor systems for moving equipment include trolleys that may only be safely installed or removed at either end of the track or in specially constructed track sections including a door.

Within a conductor bar system using door track sections, each door track's section includes a pair of hinged doors in the bottom of the track, thereby permitting insertion and removal of trolleys. This design raises the issues of securely locking the doors, and accurately aligning the doors with the remainder of the track to form an uninterrupted track for the trolleys.

A typical plastic enclosed system includes a housing of extruded plastic, with the copper conductor bars encapsulated directly into the housing. Trolleys must be installed or removed from such systems only at one end of the track. If removal of the trolley from an end of the track is not possible, the only other alternative is to pry the track open, which raises safety concerns.

Accordingly, an enclosed conductor bar system having a trolley that may be installed or removed at any point along the track is desired. Such a system would result not only in ease of manufacture and installation, but also ease in reconfiguring an existing system as needs for the system change over time.

SUMMARY OF THE INVENTION

The present invention provides a continuously installable/removable collector trolley. The trolley includes a chassis on its upper portion, having a plurality of electrically conductive brushes, which are spring biased upward. The upper portion of the chassis also includes a plurality of selectively extendable and retractable bearing assemblies. The lower portion of the trolley includes a means for extending and retracting the bearing assemblies, a means for connection to a power cord, and preferably one or more pulling loops.

In one preferred embodiment of the trolley, four bearing assemblies are provided, corresponding to the four corners of the trolley. The lower portion of the trolley preferably includes at least one release lever for extending and retracting the bearing assemblies. A preferred embodiment includes one release lever for each pair of bearing assemblies at each end of the trolley, although other possible embodiments may include a single release lever for extending and retracting all four bearings, or a separate release lever corresponding to each bearing assembly. A preferred embodiment of the release lever is a pivoting release lever, having a peg mounted radially outward from its pivot axis. The peg is dimensioned and configured to fit within a slot within the bearing assembly, so that pivoting of the release lever will cause the peg to move the bearing assembly inward or outward. For example, a pair of pegs mounted 180° apart may be utilized to enable one release lever to extend and retract a pair of bearing assemblies at one end of the trolley.

A typical bus section includes a housing with a plurality of conductor bars therein. An insulator may be provided between the conductor bars and the housing, with the bus bars retained within the insulator. The insulator is typically retained in the top of the housing. The bottom of the housing includes a shelf extending along each side, dimensioned and configured to permit the bearings to roll along it. The bottom surface of the insulator will typically be open, permitting the brushes to engage the bus bars. A polarizer extending from one side of the trolley, in conjunction with a polarizing lip depending downward from one side of the housing, may interfere with each other to resist insertion of the trolley into the conductor bar track in an incorrection orientation.

To install the trolley, a power cord for providing electrical power to a desired article of electric equipment may first be installed within the trolley. The release levers are manipulated to retract the bearings, and the trolley is inserted into the housing. The release levers are again manipulated to extend the bearings, securing the trolley within the housing. At this point, the bearings are free to roll along the shelves, and the bus bars are spring-biased upward to contact the conductor bars. Electrical current may thereby flow from the bus bars, through the brushes, to the power cord, and finally to the electrical equipment. Pulling chains may then be installed on the pulling loops to facilitate movement of the trolley within the system as desired.

A continuously installable/removable trolley for conductor bar systems is particularly useful for moving electrical equipment such as overhead cranes, aircraft hanger doors, and storage and retrieval systems.

BRIEF DESCRIPTION OF THE DRAWINGS

Like reference numbers denote like elements throughout the drawings.

DETAILED DESCRIPTION OF THE PREFERRED EMBODIMENTS

Referring to the figures, the present invention provides a conductor bar system 10 having a plurality of track sections 12, and a trolley 14 that may be installed or removed anywhere within any track section 12.

Figure 1:
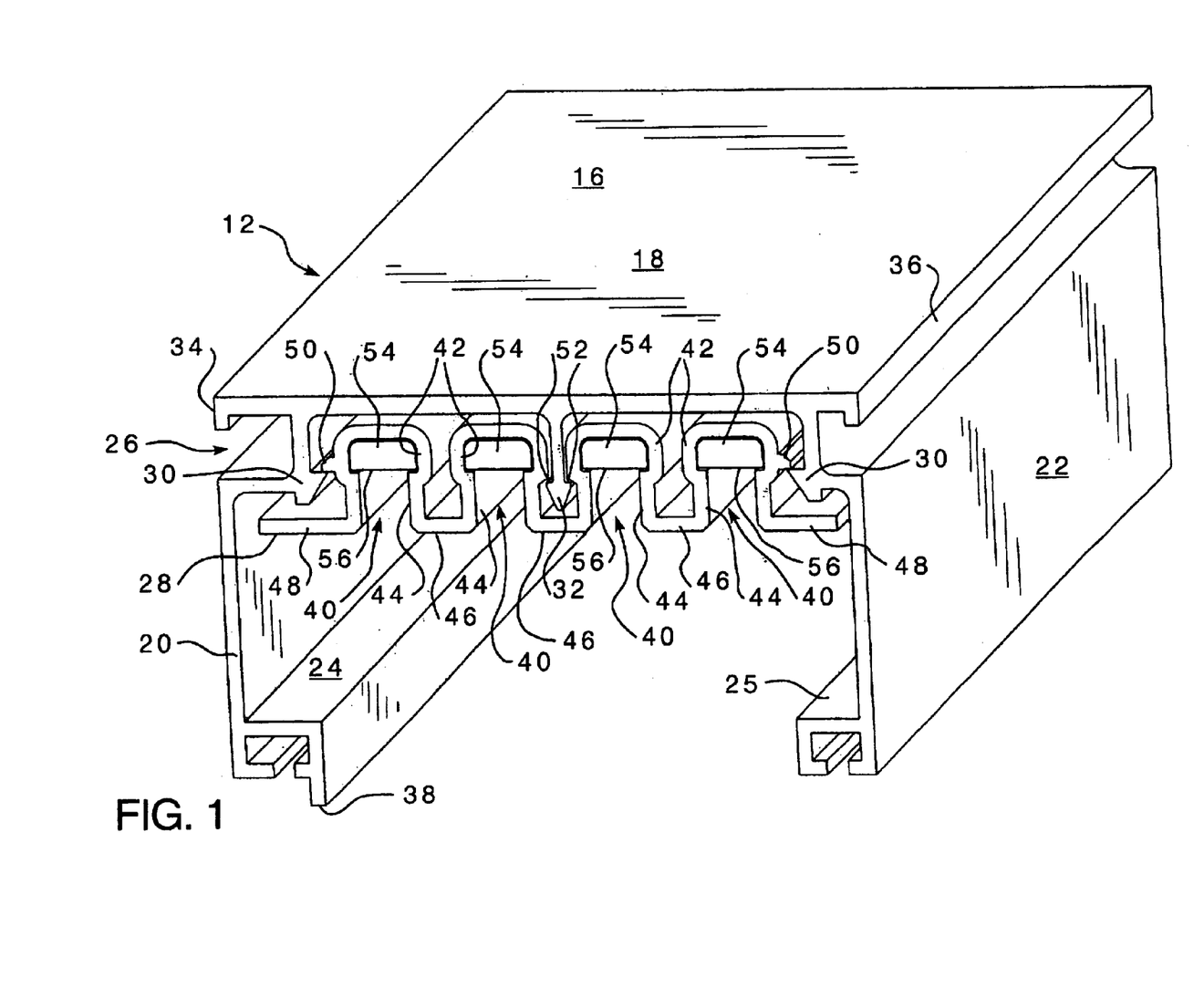
FIG. 1 is an isometric end view of a track section for a continuously installable/removable collector trolley according to the present invention.

Referring to FIG. 1, a preferred embodiment of a track section 12 is illustrated. The track section 12 includes an elongated housing 16, having a top 18 and a pair of sides 20, 22 depending downward therefrom. A shelf 24, 25 is located along the bottom edge of each of the sides 20, 22. The upper portion 26 of the track section 12 includes means for retaining an insulator 28, with the illustrated means being a plurality of retention tabs 30, 32. The top 16 also preferably includes a means for securing the track section 12 in a desired location, which in the illustrated embodiment includes the hanging flanges 34, 36. One of the shelves 24, 25 (in the illustrated example, the shelf 24) may include a polarizing tab 38 depending downward therefrom. Although the illustrated embodiment of the track section 12 is made from metal, it may also be made from plastic, with the plastic being selected for its electrical insulating properties.

Although some embodiments of the track section 12 may include a housing 16 that also serves the purpose of providing electrical insulation, the illustrated embodiment includes a separate insulator 28 retained within the upper portion 26 of the housing 16. The insulator 28, when viewed from one end, has a cross section including a plurality of inverted U-shaped channels 40, with each U-shaped channel 40 including a closed upper portion 42 and an open lower portion 44. The ends of each U-shape are connected by insulator sections 46. Insulator sections 48 extend outward from each side of the insulator 28, preventing current from flowing into the housing 16 if the housing 16 is made from an electrically conductive material. The insulator 28 also defines a plurality of retention tab engaging surfaces 50, 52, which, in cooperation with the retaining tabs 30, 32, secure the insulator 28 in the upper portion 26 of the housing 16. A conductor bar 54 is retained within the upper portion 42 of each inverted U-shaped channel 40, being secured in this location due to the lower portion 44 having a narrower width than the upper portion 42, preventing passage of the conductor 54 therethrough. Each of the conductor bars 54 therefore includes an exposed lower surface 56. The shape of the insulator 28, having the conductor bars 54 at the upper portion 42 of the inverted U-shaped channel 40, with the lower portions 44 of the U-shaped channels being connected by insulator sections 46, increases the distance that current would have to travel through the insulator 28 for a short to occur. Because air has a greater resistance than the insulator 28, and because electrical resistance increases with increasing distance that current must travel through the material in question, electrical insulation between adjacent conductor bars 54 is maximized, while simultaneously enabling conductor bars 54 to be placed relatively close together. Although the illustrated embodiment shows conductor bars 54 only along the top of the housing 16, alternative embodiments may also place conductor bars along the sides of the housing 16.

Figure 2:
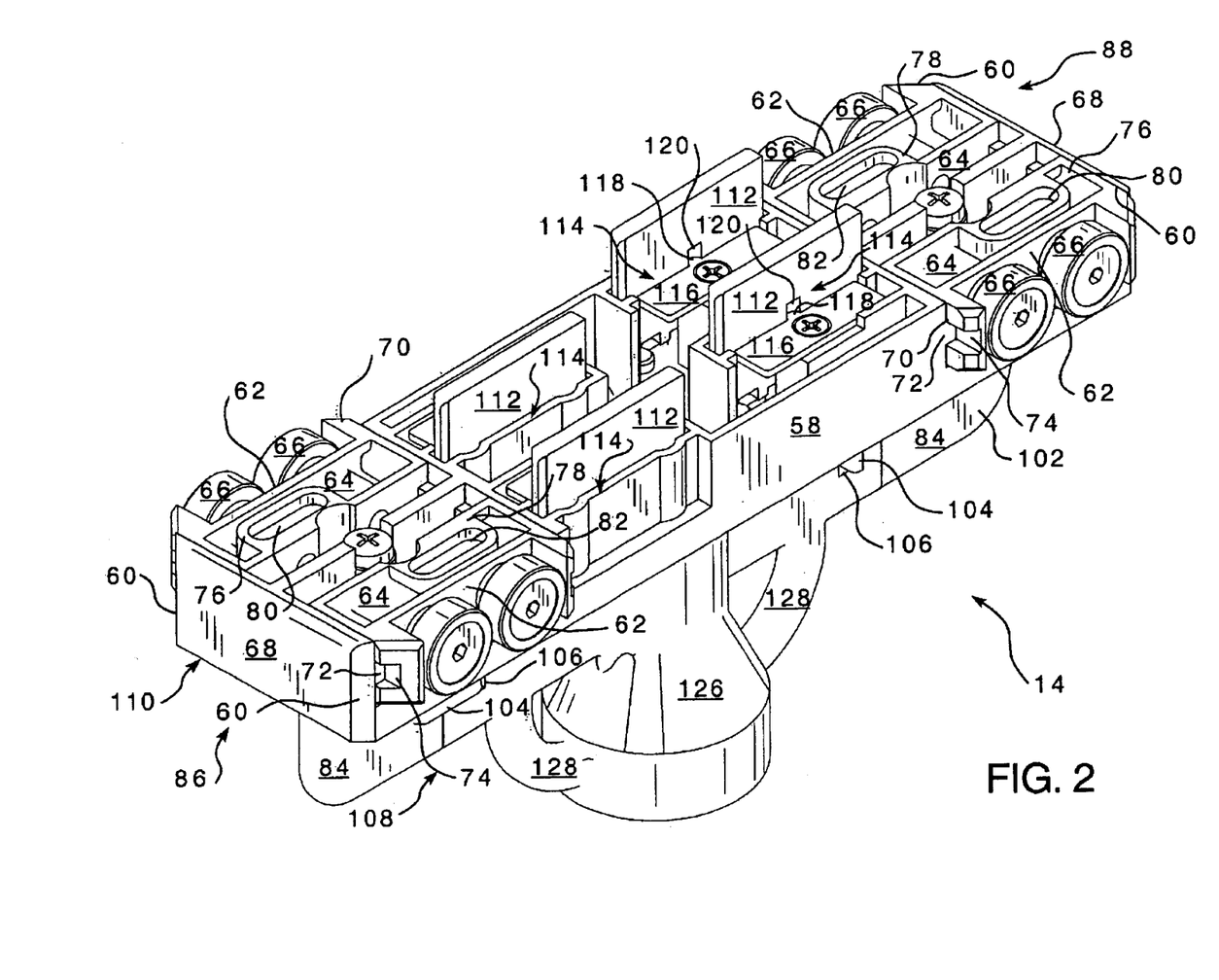
FIG. 2 is an isometric top view of a continuously installable/removable collector trolley according to the present invention.
Figure 3:
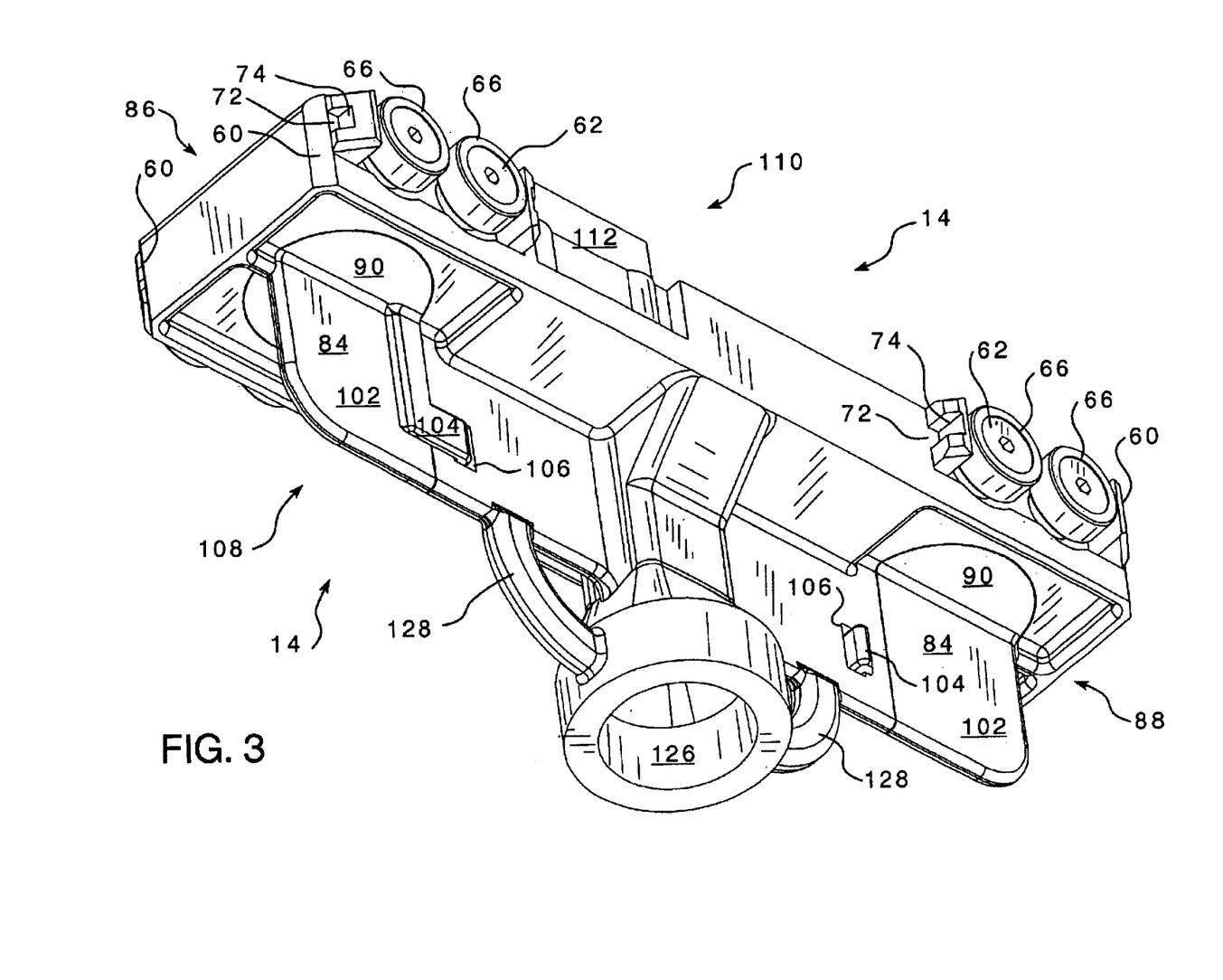
FIG. 3 is an isometric bottom view of a continuously installable/removable collector trolley according to the present invention.
Figure 4:
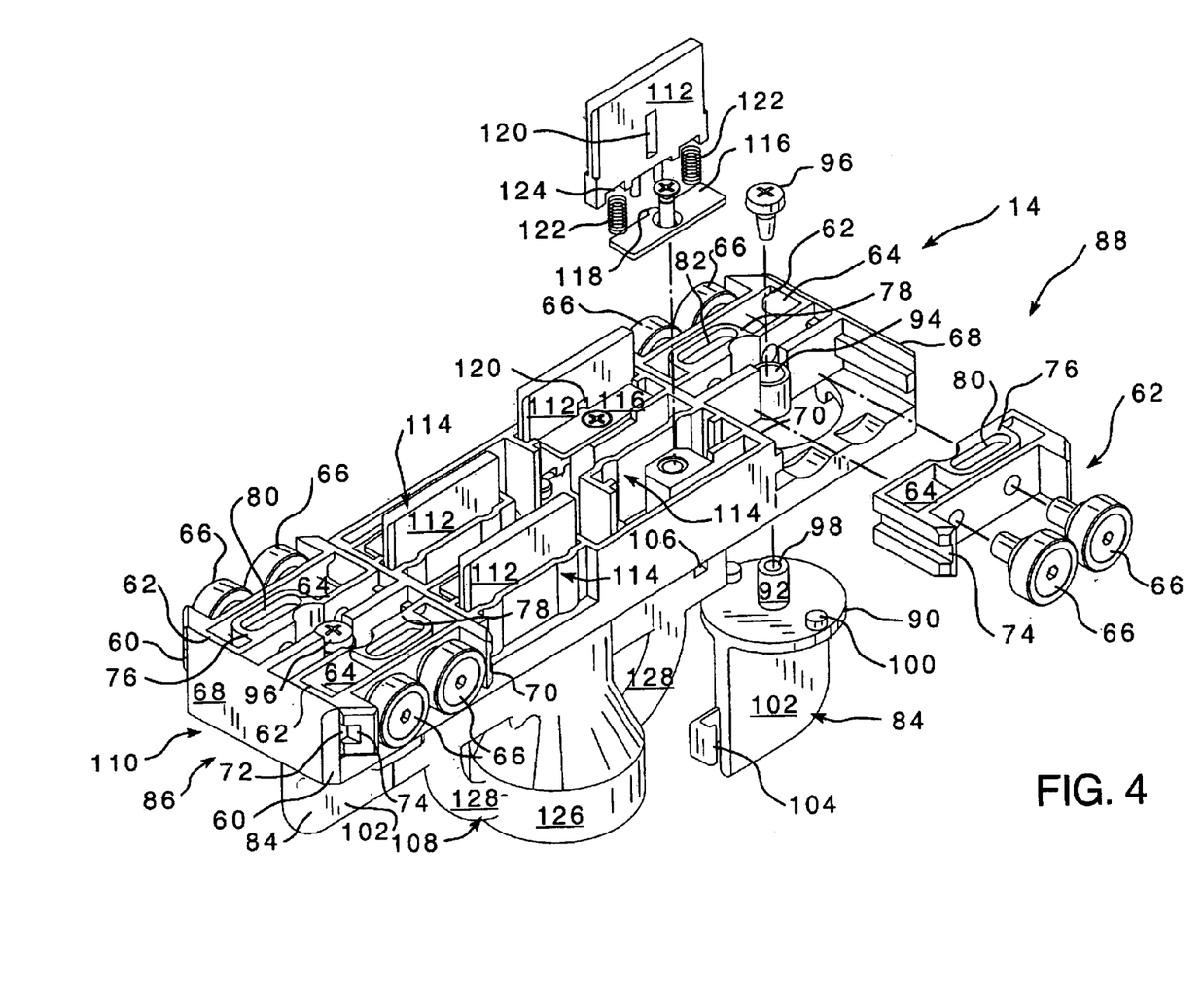
FIG. 4 is a partially exploded isometric top view of a continuously installable/removable collector trolley according to the present invention.

Referring to FIGS. 2–4, a preferred embodiment of the trolley 14 is illustrated. The trolley 14 may be made from any suitably rigid material, with plastic being preferred. The trolley 14 includes a chassis 58 having four corners 60. The chassis 58 includes a plurality of bearing assemblies 62, with a preferred embodiment including one bearing assembly 62 corresponding to each corner 60. Each bearing assembly 62 includes a body portion 64 and at least one bearing 66, with the illustrated example including two bearings 66 rotatably secured to each body portion 64. The body portion 64 is slidably mounted between the walls 68, 70, each of which includes a guide rail 72 extending therefrom, and being dimensioned and configured to fit within a channel 74 defined on either side of the body 64. Each body 64 further includes a pair of faces 76, 78, with each face 76, 78 defining a slot 80, 82, thereon. In the illustrated embodiment, each of the four bearing assemblies 62 is identical to the other bearing assemblies 62, with two of the bearing assemblies 62 having the face 76 facing upward, and the remaining two bearing assemblies 62 having the face 78 facing upward.

The chassis 58 further includes operating handles 84 for extending and retracting the bearing assemblies 62. The illustrated embodiment includes a single operating handle corresponding to the pair of bearing assemblies 62 at each end 86, 88 of the chassis 58. Each operating handle 84 includes a base 90 having a pivot 92 extending upward therefrom. In the illustrated embodiment, the pivot 92 is dimensioned and configured to fit within the aperture 94 defined within the chassis 58, where it is secured by the screw 96, fitting within the screw aperture 98 defined within the pivot 92. At least one peg 100 extends upward from the base 90, and is located radially outward from the pivot 92. The illustrated embodiment includes a pair of pegs 100 extending from each base 90, with the pegs being substantially 180° apart. Each of the pegs 100 is dimensioned and configured to fit within the slots 80, 82 of the bearing assemblies 62. Rotation of the operating handle 84 would therefore cause the pegs 100 to push against and slide within the slots 80, 82, causing the bearing assembly 62 to slide between the walls 68, 70. The operating handle 84 further includes a grasping portion 102, and a means for retaining the operating handle 84 in a position corresponding to the extended position of the bearing assemblies 62. In the illustrated example, the hook 104, extending outward from the grasping portion 102, engages a slot 106 defined within the lower portion 108 of the chassis 58 when the operating handle 84 is in a position corresponding to the extended position of the bearing assembly.

The upper portion 110 of the chassis 58 also includes a plurality of brushes 112, with each brush 112 corresponding to one conductor bar 54. The brushes 112 in the illustrated embodiment are substantially rectangular, and are slidably mounted within a channel 114 defined in the upper portion 110 of the chassis 58, so that they may move between a retracted position and an extended position. The brushes 112 are retained in the channel 114 by a brush retaining plate 116 having a tab 118 extending therefrom. The tab 118 is dimensioned and configured to fit within a slot 120 defined within the brush 112. Each of the brushes 112 is spring-biased towards its extended position by at least one spring 122, bearing against the lower surface 124 of the brush 112. The illustrated example includes a pair of springs 122 corresponding to each brush 112. Although not shown, it is well understood by those skilled in the art that each of the brushes 112 would have at least one electrically conductive wire extending therefrom, through the channel 126 defined within the lower portion 108 of the chassis 58, and extending to a desired article of electrical equipment. Although the illustrated brushes 112 all extend upward from the chassis 58 to engage conductor bars 54 located adjacent to the top 18 of the track section 12, other embodiments may include brushes extending horizontally from the chassis 58 to engage bus bars located along the sides 20, 22 of the track section 12.

A pulling chain (not shown but well known in the art) may be secured to a pulling loop 128, and connected at its other end to the electrical equipment, so that the trolley 14 may move within the conductor bar system 12 to remain in close proximity with the electrical equipment.

Figure 5:
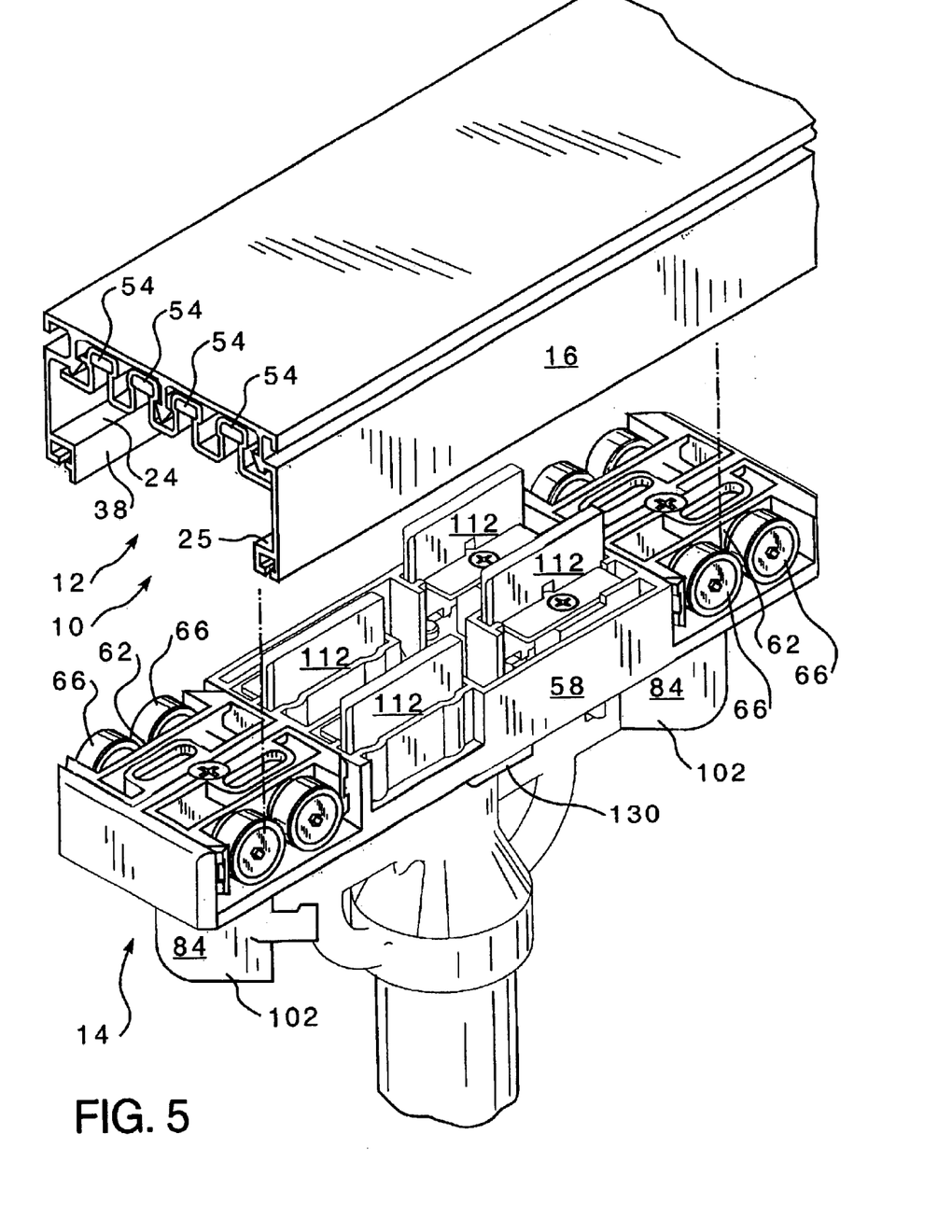
FIG. 5 is a partially exploded isometric view of a combination of a continuously installable/removable collector trolley and an associated track section.
Figure 6:
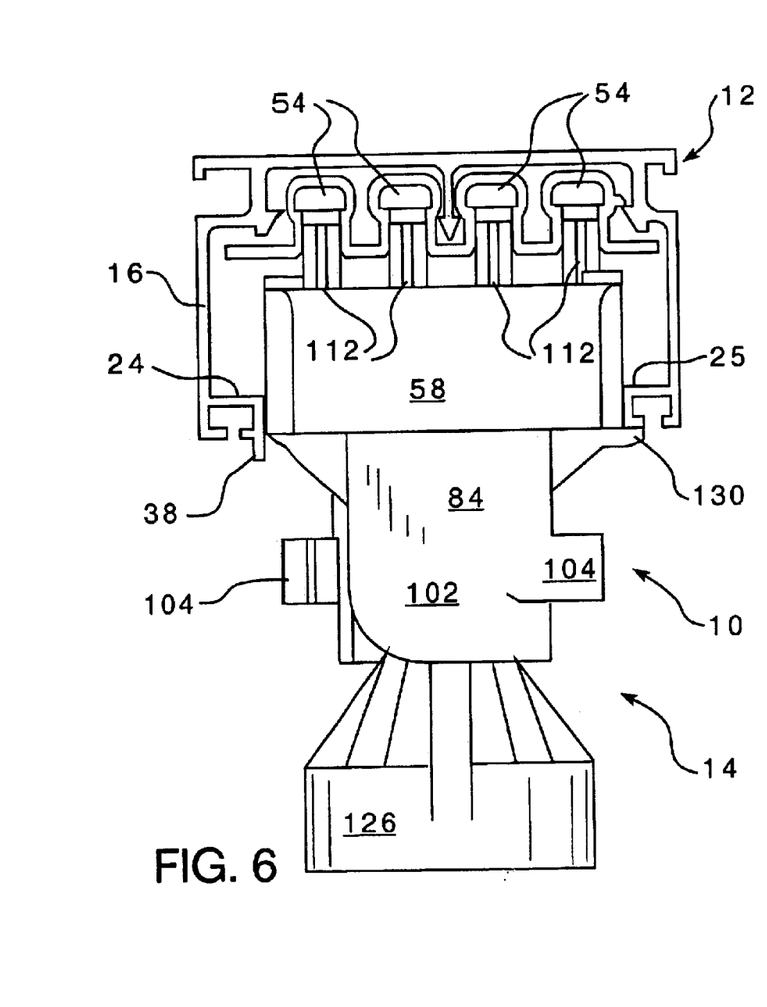
FIG. 6 is an end view of a continuously installable/removable collector trolley and its associated track, with the trolley having its bearings retracted.
Figure 7:
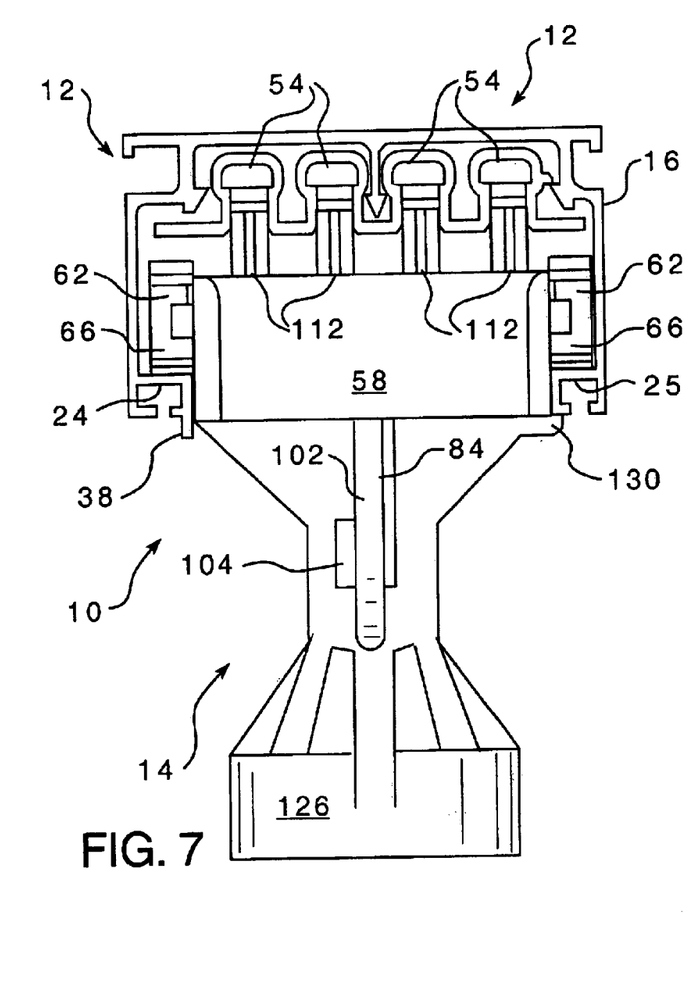
FIG. 7 is an end view of a continuously installable/removable collector trolley and its associated track, with the trolley having its bearings extended.

After installing a conductor bar system comprising a plurality of track sections 12, one or more trolleys 14 may be used within this system to supply power to a moving piece of electrical equipment. The trolley would first be connected to the equipment for which it will supply power. As shown in FIG. 5, the trolley 14 may be inserted between the shelves 24, 25 of the track section 12 when the operating handles 84 are rotated to retract the bearing assemblies 62. The polarizer 130 extending from one side of the chassis 58 would interfere with the polarizing tab 38 if the trolley 14 were inserted into the track section 12 in the incorrect orientation. FIG. 6 illustrates the trolley 14 inserted into the track section 12 in the correct orientation, with the polarizer 130 and polarizing tab 38 on opposite sides. In this position, the brushes 112 are in contact with, and forming an electrical connection with, the conductor bars 54. Once the trolley 14 is inserted into the track section 12, the operating handles 84 may be rotated to extend the bearing assemblies 62, so that the bearings 66 rest on the shelves 24, 25, thereby securing the trolley 12 within the conductor bar system 10. If desired, a pulling chain may be secured between one or more of the pulling loops 128 and the electrical equipment. Any time it is desired to remove the trolley 14 from the conductor bar system 12, rotation of the operating handles 84 will retract the bearing assemblies 62 from the position of FIG. 7 to the position of FIG. 6, permitting removal of the trolley 14 from any track section 12.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A collector trolley for use within a conductor bar system, the conductor bar system having a plurality of conductor bars contained within a housing, the housing further having a pair of shelves along its lower sections for supporting the trolley, the trolley comprising:

a chassis dimensioned and configured to fit within the housing, the chassis having four corners;

a plurality of electrically conductive brushes extending from the chassis, each of the brushes being dimensioned and configured to form an electrical connection with one of the conductor bars; and a plurality of bearing assemblies, each bearing assembly including a base and at least one bearing, each bearing assembly being structured to selectively reciprocate between a retracted position and an extended position, the bearing assemblies being dimensioned and configured to permit insertion and removal of the collector trolley from the housing when in the retracted position, and to support the collector trolley on the shelves, with the bearings rolling along the shelves and each of the brushes forming an electrical connection with one of the conductor bars, when the bearing assemblies are in the extended position.

2. The collector trolley according to claim 1, wherein the bearing assemblies are four in number, with one bearing assembly disposed adjacent to one of the four corners of the collector trolley.

3. The collector trolley according to claim 2, further comprising a pair of release levers, each of the release levers being dimensioned and configured to selectively and generally simultaneously extend and retract two of the four bearing assemblies.

4. The collector trolley according to claim 1, wherein each bearing assembly includes a pair of bearings.

5. The collector trolley according to claim 1, wherein:

the chassis includes a polarizer; and the housing includes a polarizing lip, dimensioned and configured to interfere with the polarizer upon insertion of the chassis into the housing in an improper orientation, thereby resisting insertion of the chassis in the improper orientation.

6. The collector trolley according to claim 1, wherein the brushes are in the form of generally rectangular plates.

7. The collector trolley according to claim 6, wherein the brushes are slidably mounted within the chassis, with the brushes sliding between a retracted position and an extended position, and being spring-biased towards the extended position.

8. A collector trolley for use within a conductor bar system, the conductor bar system having a plurality of conductor bars contained within a housing, the housing further having a pair of shelves alone its lower sections for supporting the trolley, the trolley comprising:

a chassis dimensioned and configured to fit within the housing, the chassis having four corners;

a plurality of electrically conductive brushes extending from the chassis, each of the brushes being dimensioned and configured to form an electrical connection with one of the conductor bars;

four bearing assemblies, each bearing assembly being disposed adjacent to one of the four corners of the collector trolley, each bearing assembly including a base and at least one bearing, each bearing assembly being structured to selectively reciprocate between a retracted position and an extended position, the bearing assemblies being dimensioned and configured to permit insertion and removal of the collector trolley from the housing when in the retracted position, and to support the collector trolley on the shelves, with the bearings rolling alone the shelves and each of the brushes forming an electrical connection with one of the conductor bars, when the bearing assemblies are in the extended position;

a pair of release levers, each of the release levers being dimensioned and configured to selectively and generally simultaneously extend and retract two of the four bearing assemblies, each release lever further having:

a base;

a handle portion;

a pivot axis about which the release lever is rotated;

a pair of pins extending from the base, located radially outward from the pivot axis;

the base of each bearing assembly defines a slot dimensioned and configured to receive one of the pins; and the release levers and bearing assemblies being dimensioned and configured so that rotation of each release lever causes the pin to push the pair of bearing assemblies associated with it towards either their extended position or their retracted position.

9. The collector trolley according to claim 8, wherein each of the release levers includes a means for securing the release lever in a position corresponding to the extended position of the bearings.

10. A conductor bar system, comprising:
an elongated housing, comprising:
   a plurality of conductor bars;
   a pair of lower sections, each lower edge section having a shelf;
a collector trolley, comprising:
   a chassis dimensioned and configured to fit within the housing, the chassis having four corners;
   a plurality of electrically conductive brushes extending from the chassis, each of the brushes being dimensioned and configured to form an electrical connection with one of the conductor bars; and
   a plurality of bearing assemblies, each bearing assembly including a base and at least one bearing, each bearing assembly being structured to selectively reciprocate between a retracted position and an extended position, the bearing assemblies being dimensioned and configured to permit insertion and removal of the collector trolley from the housing when in the retracted position, and to support the collector trolley on the shelves, with the bearings rolling along the shelves and each of the brushes forming an electrical connection with one of the conductor bars, when the bearing assemblies are in the extended position.

11. The conductor bar system according to claim 10, wherein the bearing assemblies are four in number, with one bearing assembly disposed adjacent to one of the four corners of the collector trolley.

12. The conductor bar system according to claim 11, further comprising a pair of release levers, each of the release levers being dimensioned and configured to selectively and generally simultaneously extend and retract two of the four bearing assemblies.

13. The conductor bar system according to claim 10, wherein each bearing assembly includes a pair of bearings.

14. The conductor bar system according to claim 10, wherein:
   the chassis includes a polarizer; and
   the housing includes a polarizing lip, dimensioned and configured to interfere with the polarizer upon insertion of the chassis into the housing in an improper orientation, thereby resisting insertion of the chassis in the improper orientation.

15. The conductor bar system according to claim 10, wherein the brushes are in the form of generally rectangular plates.

16. The conductor bar system according to claim 15, wherein the brushes are slidably mounted within the chassis, with the brushes sliding between a retracted position and an extended position, and being spring-biased towards the extended position.

17. A conductor bar system, comprising:
an elongated housing, comprising:
   a plurality of conductor bars;
   a pair of lower sections, each lower edge section having a shelf;
a collector trolley, comprising:
   a chassis dimensioned and configured to fit within the housing, the chassis having four corners;
   a plurality of electrically conductive brushes extending from the chassis, each of the brushes being dimensioned and configured to form an electrical connection with one of the conductor bars;
   four bearing assemblies, each bearing assembly being disposed adjacent to one of the four corners of the collector trolley, each bearing assembly including a base and at least one bearing, each bearing assembly being structured to selectively reciprocate between a retracted position and an extended position, the bearing assemblies being dimensioned and configured to permit insertion and removal of the collector trolley from the housing when in the retracted position, and to support the collector trolley on the shelves, with the bearings rolling alone the shelves and each of the brushes forming an electrical connection with one of the conductor bars, when the bearing assemblies are in the extended position;
   a pair of release levers, each of the release levers being dimensioned and configured to selectively and generally simultaneously extend and retract two of the four bearing assemblies, each release lever further having:
      a base;
      a handle portion;
      a pivot axis about which the release lever is rotated;
      a pair of pins extending from the base, located radially outward from the pivot axis;
   the base of each bearing assembly defines a slot dimensioned and configured to receive one of the pins; and
   the release levers and bearing assemblies being dimensioned and configured so that rotation of each release lever causes the pin to push the pair of bearing assemblies associated with it towards either their extended position or their retracted position.

18. The conductor bar system according to claim 17, wherein each of the release levers includes a means for securing the release lever in a position corresponding to the extended position of the bearings.

* * * * *